US006327625B1

(12) United States Patent
Wang et al.

(10) Patent No.: US 6,327,625 B1
(45) Date of Patent: Dec. 4, 2001

(54) FIFO-BASED NETWORK INTERFACE SUPPORTING OUT-OF-ORDER PROCESSING

(75) Inventors: Chi-Lie Wang, Sunnyvale; Li-Jau Yang; Ngo Thanh Ho, both of San Jose, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/451,395

(22) Filed: Nov. 30, 1999

(51) Int. Cl.[7] ....................................................... G06F 15/16
(52) U.S. Cl. ........................... 709/235; 709/220; 709/250; 710/52; 710/129
(58) Field of Search ................................. 709/235, 220, 709/250; 710/52, 129

(56) References Cited

U.S. PATENT DOCUMENTS

| 4,783,730 | 11/1988 | Fischer | 364/200 |
| 5,212,778 | 5/1993 | Dally et al. | 395/400 |
| 5,828,835 | 10/1998 | Isfeld et al. | 395/200.3 |
| 5,987,113 | * 11/1999 | James | 379/211 |
| 6,138,189 | * 10/2000 | Kalkunte | 710/53 |
| 6,226,680 | 5/2001 | Boucher et al. | 709/230 |

* cited by examiner

*Primary Examiner*—Ario Etienne
(74) *Attorney, Agent, or Firm*—Mark A. Haynes; Haynes Beffel & Wolfeld LLP

(57) ABSTRACT

Support for priority and IP security packets, and other protocols at the network interface level and in conjunction with FIFO-based packet buffers is provided by allowing out of order processing of certain packets in the FIFO. The optimized character of FIFO for sequential transfer is maintained, while particular types of packets are processed out of order to achieve minimum latency and maximum data security in an intelligent network interface card. A buffer stores data packets in an order of receipt. Logic is included in the network interface to transfer packets out of the buffer according to the order of receipt, and according to the respective packet types so that packets having a particular packet type are transferred out of the order of receipt relative to packets having other packet types.

36 Claims, 8 Drawing Sheets

FIFO-BASED NETWORK INTERFACE SUPPORTING OUT-OF-ORDER PROCESSING

BACKGROUND OF THE INVENTION

1. Field of the Invention

The present invention relates to computer networks and to interface devices for connecting host computers to networks. More particularly, the present invention relates to the management of data traffic through network interface cards in network connected systems.

2. Description of Related Art

Computer systems include network interfaces that support high speed data transfer between the host computer and the data network. These network interfaces are typically based on a first-in-first-out (FIFO) buffer. Thus, packets coming onto the network interface, either from the network or from the host computer are stored in the FIFO. The first packet into the FIFO is transmitted out first in order to maintain sequential data transfers. The FIFO structure is an efficient, high throughput system for managing high speed network interfaces such as Gigabit Ethernet interfaces.

As computer networks are adapted to carry a variety of types of traffic, network protocols are being developed to support variant processing of packets as they traverse the network. Thus, priority packets are developed which are suitable for carrying real-time video or audio signals. These priority packets are processed ahead of other packets in sequence when possible to improve the throughput and reduce the latency of processing for this class of packet. Also, network security is supported for some types of packets. Thus, the Internet security IPsec protocols are being developed. (Request For Comments, 2401 Security Architecture for the Internaet Protocol, Internet Engineering Task Force). According to security protocols, the payload and/or the header and other control data associated with the packet are protected using authentication and encryption processes. Accordingly, a variety of priority schemes and other schemes involving processing of packets according to particular processes like encryption through the network have been developed.

The FIFO structure in network interface cards suffers the disadvantage that it is inflexible in the sequence of processing of packets being transferred through the interface, that is, a FIFO structure supports only sequential data transfer. Each packet being loaded will be unloaded through the same sequence determined by the order of receipt of the packet into a typical FIFO-based network interface. Therefore, the processing of packets according to protocols which may benefit from processing out of order must be executed before the packets are delivered to the network interface, or after the packets leave the network interface.

Accordingly, it is desirable to provide techniques for improving the flexibility of network interfaces, while maintaining the efficient character of FIFO structures.

SUMMARY OF THE INVENTION

The present invention provides support for priority and Internet Protocol security packets, and other protocols at the network interface level and in conjunction with FIFO-based packet buffers. The present invention supports such protocols by allowing out of order processing of certain packets in the FIFO. In this manner, the optimized character of FIFO for sequential transfer is maintained, while particular types of packets are processed out of order to achieve minimum latency and maximum data security in an intelligent network interface card.

One aspect the present invention is a computer system that comprises a host processor and a network interface having a first port coupled to the host processor and a second port adapted for at least one of receiving data from and transmitting data to a network. A buffer is coupled to the first and second ports and stores data packets from one of the first and second ports in an order of receipt, said packets identifiable as having respective packet types from a plurality of packet types. Logic is included in the network interface to transfer packets out of the buffer to the other of the first and second ports according to the order of receipt, and according to the respective packet types so that packets having a particular packet type are transferred out of the order of receipt relative to packets having other packet types.

In one embodiment, a data filter is coupled with the buffer to generate identifiers identifying packets of data stored in the buffer as members of one of a plurality of packet types. Logic maintains a list of packets stored in the buffer having a particular packet type. The logic to transfer the packets is responsive to the list to determine the order in which a given packet is transferred out of the buffer. Thus for example, priority packets are identified and entries placed in a queue of priority packets on the network interface. Packets identified in the queue are transferred out of the buffer ahead of other packets not identified in the queue. When the queue is empty, packets of other types are transferred out of the buffer. Also when the queue is not empty, but the buffer approaches a fullness threshold, packets of other types may be flushed from the buffer to minimize data overruns and other errors in the transfer of the packets.

In another embodiment, packets of the particular types are suitable for processing according to a process such as an encryption or authentication process. Such packets are identified and read out of the buffer for such processing. A control parameter is associated with the packet which indicates whether such processing has completed and whether the packet is ready for transfer. Logic which transfers packets out of the buffer is responsive to the control parameter to skip the packet and transfer a following packet in the buffer out of order. When the processing is complete, the control parameter is updated and the logic transferring packets out of the buffer is notified that the skipped packet may be transferred.

In yet another embodiment, the logic to transfer the packet includes processing resources which perform, in various combinations and orders, the following functions:

- set up a control field for each packet stored in the buffer in an order of receipt;
- write a parameter in the control field indicating the packet type has one of a plurality of packet types, including a first packet type, a second packet type and a third packet type;
- write a parameter in the control field indicating whether the packet has already been transferred;
- maintain a queue of entries identifying packets having the third packet type;
- process packets having the second packet type according to a particular process;
- write a parameter in the control field for packets having the second packet type indicating whether the packet is ready for transfer and the processing according to the particular process is complete;
- maintain an indicator of fullness of the buffer; and
- transfer a packet from the buffer according to a priority rule which causes transfer of a packet identified by an entry in the queue ahead of packets in the buffer having the first and second packet types relative to the order of receipt, causes transfer of a packet having the first packet type in the order of receipt of the packet, if the parameters in the control field indicate the packet is ready for transfer, and the queue of entries is empty or the indicator of fullness exceeds a threshold, and skips transfer of a packet having the second packet type relative to the order of receipt if the parameter in the control field indicates the processing is not complete.

In other embodiments, the invention comprises a network interface, an integrated circuit for use in a network interface, and a processing method for transferring packets through the network interface.

The present invention improves network interfaces based on FIFO buffer structures. Priority packets and packets such as IPSec packets can be marked in a header using packet filter logic. Priority packets can be transmitted or uploaded prior to normal packet traffic. Also, if the FIFO space is near a full threshold, the priority packet transfer is temporarily suspended. Normal packets in the FIFO ahead of priority packets can be unloaded first to free up FIFO space to prevent the undesirable FIFO full condition. Also, IPSec packets can be unloaded from the FIFO and processed by encryption/decryption engines and re-loaded back into the FIFO without affecting normal packet data transfer flow. Whenever an IPSec packet becomes the top packet before processing of the payload is complete, the IPSec packet can be skipped by the packet transfer logic and normal packets and priority packets can be transferred out of the buffer without being blocked.

Furthermore, normal packets, priority packets and IPSec packets can coexist in a FIFO-based structure. The system supports minimum latency and maximum security requirements at the network interface level.

Other aspects and advantages of the present invention can be seen upon review of the figures, the detailed description, and the claims which follow.

DETAILED DESCRIPTION

Figure 1:
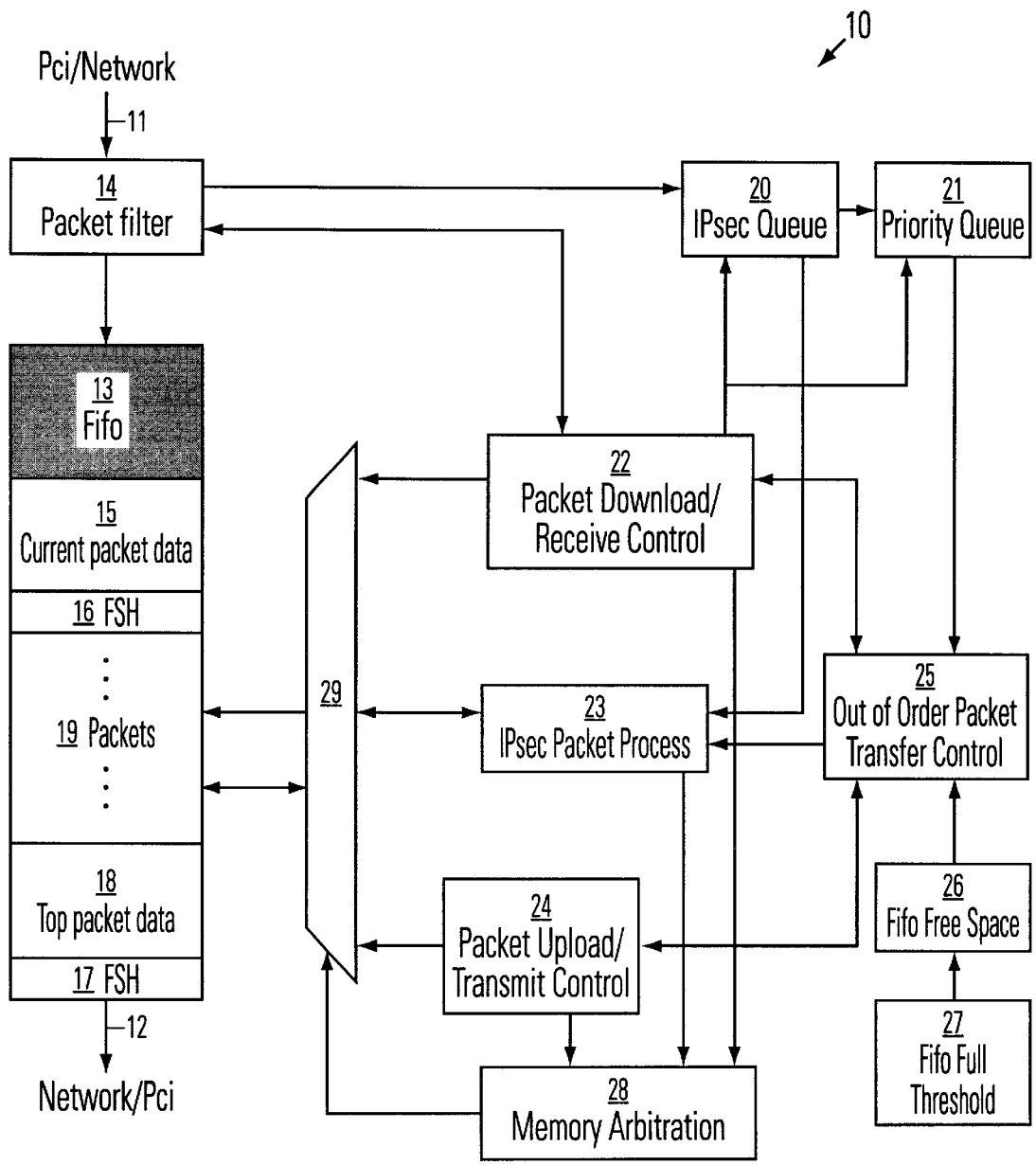
FIG. 1 is a simplified block diagram of a network interface supporting out of order packet transfer according to the present invention.

A detailed description of embodiments of the present invention is provided with respect FIGS. 1–8. FIG. 1 provides a conceptual diagram of an integrated circuit 10 including the logic for transferring data packets into and out of a FIFO buffer according to the present invention.

The integrated circuit has a first port 11 and a second port 12. In the diagram, a single FIFO 13 is illustrated, however, in a typical implementation, separate FIFO's are used for the receive (host to network) and transmit (network to host) paths. Thus, the first port 11 is illustrated as adapted for transferring data from one of the host bus, in this example a PCI bus, and the data network, such as a Gigabit ethernet network. Likewise, the second port 12 is illustrated as adapted for transferring data to one of the network, and the host bus.

Incoming data on the port 1 1 is supplied to a packet filter 14 which identifies the packet as one of a plurality of packet types. From the packet filter 14, the packet is stored in the FIFO 13 at a location indicated as current packet data 15 in the diagram. A frame start header 16 for the current packet is set up to carry control data and parameters relevant to the packet. The FIFO 13 includes a top packet that includes a frame start header 17 and top packet data 18. Other packets are stored in the region 19 of the FIFO, as known in the art.

The packet filter 14 is coupled to a plurality of queues, including in this example an IPsec queue 20 and a priority queue 21. Also, the packet filter 14 is coupled to a packet download/receive control unit 22. The integrated circuit 10 also includes processing resources for packets of particular types, in this example, IPsec packet processing resources 23. In addition, packet upload/transmit control logic 24 is included on the chip. According to the present invention, an out of order packet transfer control block 25 is included which is coupled to logic 26 which maintains an indicator of free space in the FIFO, and logic 27 which maintains a FIFO fullness threshold.

The packet download/receive control block 22, the IPsec packet process block 23, and a packet upload/transmit control block 24 access the buffer 13 through memory arbitration logic 28 and multiplexer 29. Address and data signals are supplied from the currently active process via the multiplexer 29 to the FIFO to support read and write of data and control parameters.

Figure 2:
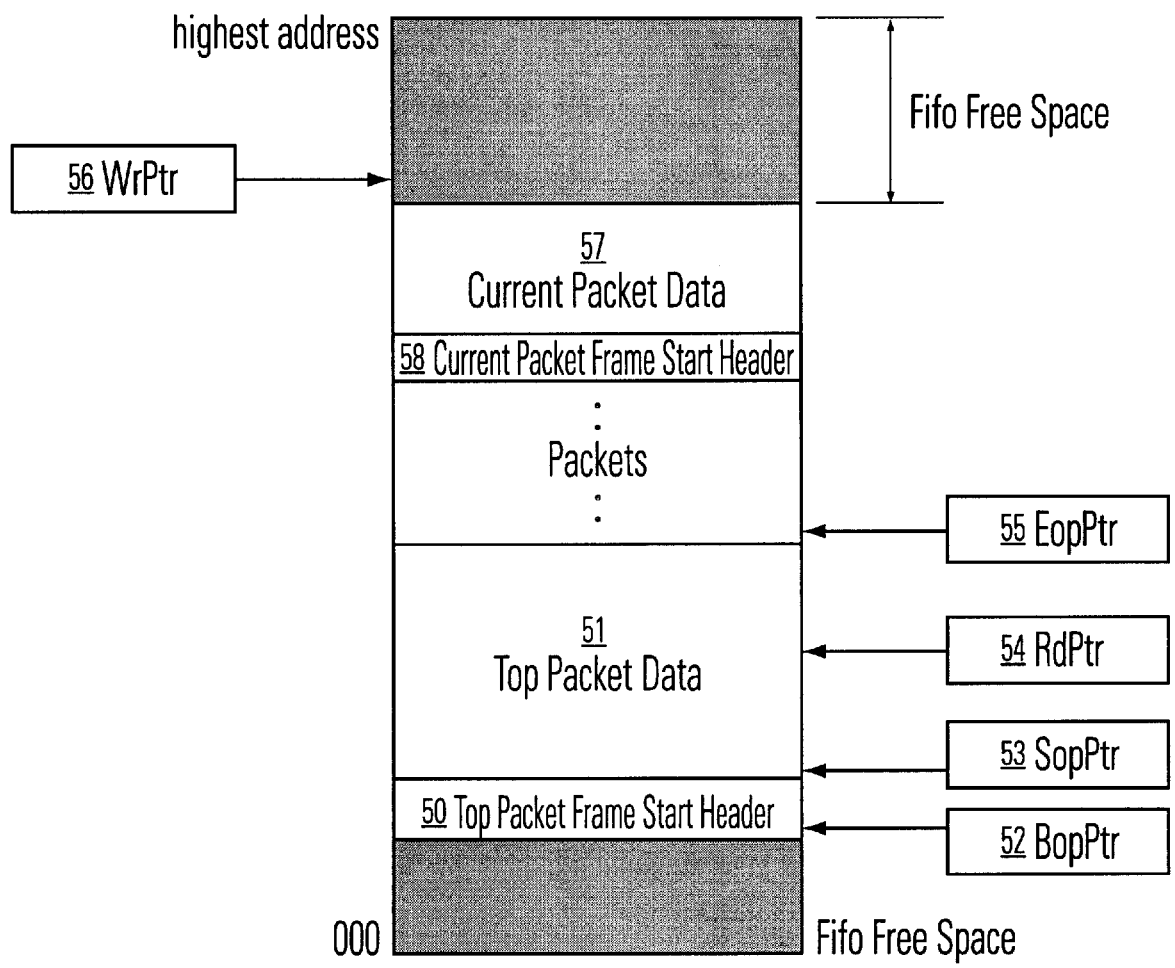
FIG. 2 illustrates in the buffer data structure used in the FIFO based packet buffer in the system of FIG. 1.

Logic in the integrated circuit 10 maintains a set of pointers for management of the FIFO 13. FIG. 2 illustrates the data structure and pointers for the packet buffer 13. The top packet includes a top packet frame start header 50 and top packet data 51. A beginning of packet pointer BopPtr 52 points to the beginning of the top packet frame start header 50. A start of packet pointer SopPtr 53 points to the first data byte in the top packet data field 51. A read pointer RdPtr 54 points to a location in the buffer for a current read process. An end of packet pointer EopPtr 55 points to the first byte after the end of the top packet data field 51. The end of packet pointer 55 becomes the beginning of packet pointer for the next packet in the sequence when the packets are processed in order. According to the present invention, packets are not always processed in order. The data structure also includes a write pointer WrPtr 56 for data being loaded into the buffer in a current packet data field 57 in the illustrated example. Upon the beginning of the loading of the current packet, a current packet frame start header is set up in field 57. The current packet frame start header is set up when the current packet begins loading into the buffer. It carries a control parameter indicating whether the frame start header contains valid data. This parameter will indicate that the frame start header is a "null" header until the current packet data field has completely loaded, or until a valid frame start header is written containing sufficient information to support the transfer of the packet.

According to the present invention, the frame start header includes a first bit which when 0 indicates that the header is a null header. This null header is ignored until the first bit is set to 1. The frame start header also includes a priority packet bit, a priority done bit, an IPsec packet bit, and an IPsec packet done bit. These control parameters are carried in the frame start header, or otherwise associated with packets in the buffer. The control parameters indicate the packet type and a state of processing of the packet.

Figure 3:
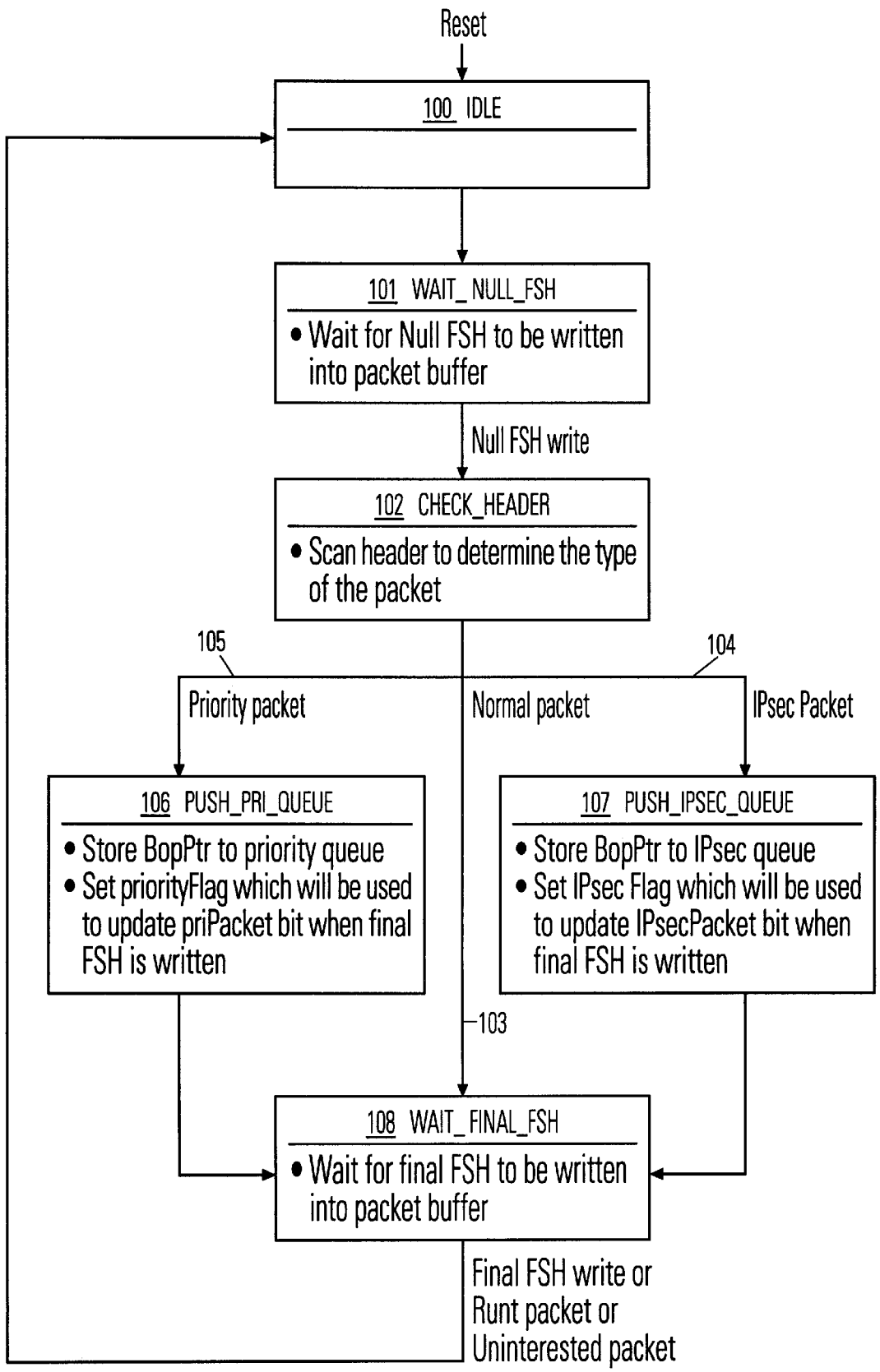
FIG. 3 is a diagram illustrating the function of the packet filter in the system of FIG. 1.

FIG. 3 illustrates the operation of the packet filter according to one embodiment of the invention. This process includes an idle state 100. From the idle state 100, the process waits for a null frame start header be written into the buffer (state 101). After the process detects the null frame start header, the packet filter checks the header of the packet to determine its type (state 102). IPsec packets can be identified by the security association parameters carried in the packet headers. Likewise, priority packets can be identified by parameters indicating the priority of the packet. In this embodiment, the packet filter identifies three classes of packets. The first type of packet is normal packet is indicated by branch 103. Second type of packet is the IPsec packet is the indicated by branch 104. The third type of packet is the priority packet as indicated by branch 105. If the packet is a priority packet, then a beginning of packet pointer for the priority packet is written to the priority queue 21 (state 106). Also in state 106, a flag is set in the logic which is used to update the priority packet bit in the frame start header, when the frame start header is finally written. If the packet is an IPsec packet, then a beginning of packet pointer for the packet is stored in the IPsec queue 20 (state 107). Also in state 107, an IPsec flag is set that will be used update the IPsec packet bit when the final frame start header is written. From states 106 and 107, the process branches to state 108. Likewise, if the packet is determined to be a normal packet at state 102, then the process transitions directly state 108. In state 108, the packet filter waits for the final frame start header to be written into the packet buffer. In this state 108, the final frame start header is written, or a runt packet or an uninteresting packet is detected, which causes the process to loop back to state 100. When the final frame start header is written, a header is completed for the transmit or upload operation.

Thus, normal packets are transmitted or uploaded according to the order in which they were received in the buffer. In order to transfer priority packets used for multimedia applications, or to encrypt/decrypt packets for network security, the packets may need to be transmitted or uploaded out of the sequential order of receipt. Thus, the present invention defines control parameters in the frame start header to support priority packets, and IPsec packets for the purposes of out of order transfers.

For a priority packet, the first bit called a priority packet bit, identifying the packet as a priority packet, and a second bit called a priority done bit, indicating whether the packet has been successfully transferred, are added to the frame start header. Each time a packet is written to the FIFO, the packet filter logic scans the packet header or other control structures in the packet. Upon detecting a priority packet, the beginning of packet pointer is pushed into the priority queue. The beginning of packet pointer stored in the queue is used indicate the beginning location of each priority packet. A priority packet flag is also set to inform the current packet write logic that a priority packet bit should be set when the final frame start header of this priority packet is written into the FIFO. The priority done bit will be set in the frame start header only when a priority packet is transmitted or uploaded out of the buffer. Since priority packets can be transmitted or uploaded prior to normal packets, after servicing the normal packets, each encountered priority packet which has both the priority packet bit and the priority done bit set will be skipped.

Detected IPsec packets have an IPsec packet bit and an IPsec done bit defined in the frame start header. The packet filter logic scans the packet in the same way as is done for priority packets, and pushes the beginning of packet pointer into the IPsec queue upon detecting an IPsec packet. An IPsec packet flag is set which is used by the current packet write logic to set the IPsec packet bit when writing the final frame start header of the IPsec packet. When the beginning of packet pointer is stored in the IPsec queue, processing of the IPsec packet can be executed in the background of the packet transfer process. Upon finishing the processing of the IPsec packet, the IPsec done bit is set in the frame start header. All of the IPsec packets can be processed in parallel with normal and priority packet transfer processes, as long as they are not the top packet in the FIFO. When an IPsec packet becomes the top packet, but has not completed processing yet, an out of order packet transfer is invoked to prevent the unfinished IPsec packet from blocking subsequent packets in the FIFO. A pointer to the skipped IPsec packet is saved, and the data transfer flow is executed for following packets. At the end of each packet transfer, the frame start header for the skipped IPsec packet is checked to determine whether the IPsec done bit has been set. If the IPsec done bit is set indicating that the IPsec processing has been completed, then the saved IPsec packet pointer is used to begin the transfer of the IPsec packet out of the buffer.

Figure 4:
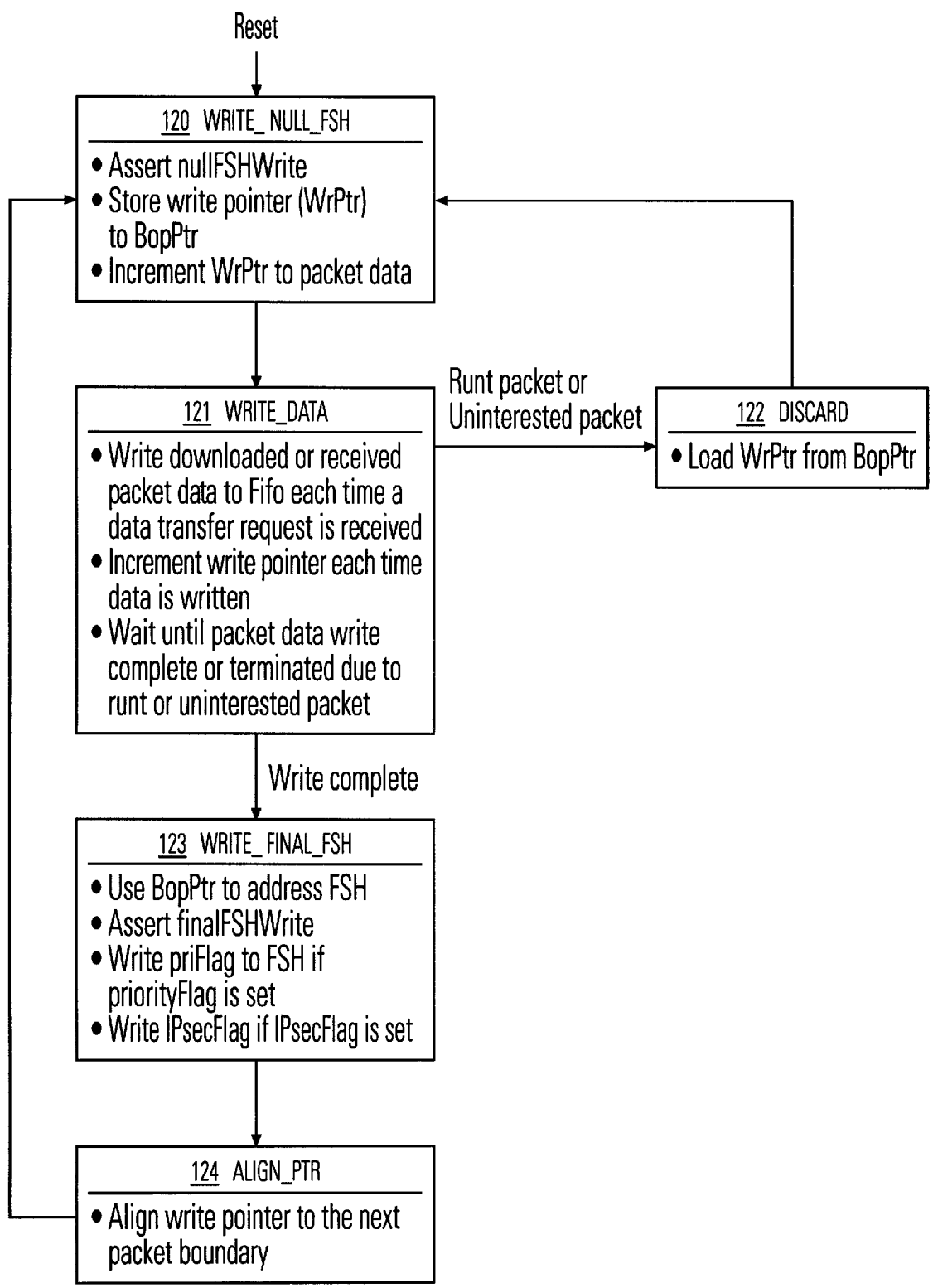
FIG. 4 is a diagram illustrating the function of the packet write process for the system of FIG. 1.

FIG. 4 illustrates one embodiment of the processing of the packet download/receive control block 22. The logic block 22 upon detection of an incoming packet enters a state 120. In state 120, a null frame start header write operation is executed to set up the frame start header structure. The current write pointer value is stored as the beginning of packet pointer for this incoming packet. The write pointer is then incremented to load the packet data. After creation of the frame start header, the process transitions to state 121. In state 121, the downloaded or received packet data is written to the FIFO each time a data transfer request is received. The write pointer is incremented each time the date is written. The logic stays in state 121 until the complete packet is written, or the packet is discarded because of runt packet detection or other process causing uninteresting packets to be discarded. If the packet is to be discarded, the processed branches to state 122. In state 122, the write pointer is reset to the value of the beginning of packet pointer for the discarded packet. If the write successfully completes, the process transitions to state 123. In state 123, the beginning of packet pointer is used to access the frame start header structure. The final frame start header write process is executed. The priority flag and the IPsec flag are used to set the priority bit and IPsec bit in the frame start header. Next, the process transitions to state 124 in which the write pointer is aligned with the next packet boundary. After aligning the write pointer with the next packet boundary, the process is ready for the following packet, and the process loops back to state 120.

Thus, packets are loaded into the FIFO through either the download or receive paths in the network interface. A null frame start header is written first to mark a dynamic packet, that is, a packet that has not been completely downloaded or received. If parallel tasking is not enabled, the transmit/upload path for the dynamic packet will not be activated until the packet has been completely downloaded/received with a final frame start header being written to mark a static packet. After the null frame start header write, packet data is loaded into the FIFO one segment at a time until the complete packet has been written. In case a runt packet is received due to a collision, or the received packet is of no interest to the host computer, the packet will be discarded and the FIFO space will be freed up to accommodate more packets. Otherwise, a final frame start header is written into the FIFO to mark the packet as a static packet ready for transfer out of the buffer. Either the packet length or the end of packet pointer will also be stored in the frame start header which can be used to identify where the packet ends. The priority packet bit will be set for a priority packet, and the IPsec packet bit will be set for an IPsec packet in response to the filter logic. After the final frame start header is written, the write pointer will be aligned to the next packet boundary.

Figure 5:
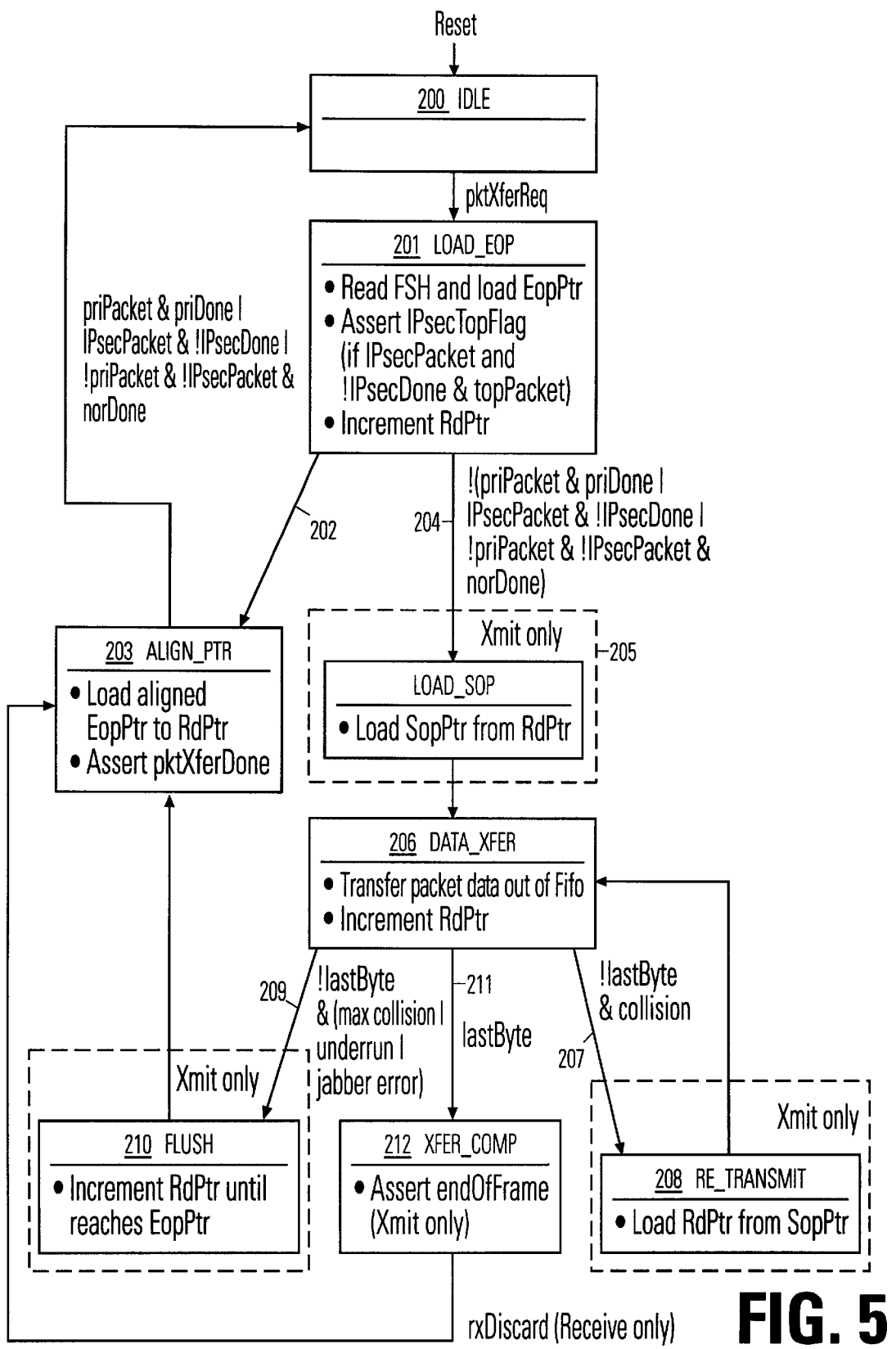
FIG. 5 is a diagram illustrating the function of the packet transmit/upload logic in the system of FIG. 1.

FIG. 5 illustrates one embodiment of the operation of the packet transmit/upload logic 24 for the system of FIG. 1. For a packet transfer out of the buffer, the process begins in idle state 200. When a packet transfer request is issued, the process proceeds to state 201 in which it loads an end of packet pointer. This process involves reading a frame start header and loading the end of packet pointer. The process asserts an IPsec top flag, if the packet is an IPsec packet, processing of the IPsec packet is not finished, and it is the top packet in the buffer. Next, the read pointer is incremented. From state 201, the process branches either on path 202 to the align pointer state 203, or on path 204 to the load start packet state 205, for a process involving transmit to the network only. For processes involving uploading to the host, state 205 is skipped, and the algorithm branches directly to the data transfer state 206.

The process branches to state 203 in three conditions. The first condition arises if the packet is a priority packet, and the priority done bit is set. In the second condition, the process branches to state 203 if the packet is an IPsec packet, and processing of the IPsec packet is not finished. The process branches to state 203 in the third condition if the packet is not a priority packet nor an IPsec packet, and a normal packet done flag is set. In state 203, the aligned end of packet pointer is loaded as the read pointer, and the packet transfer done signal is asserted. From align pointer state 203, the process loops back to state 200 to await the next packet.

If at state 201, branch 204 is taken for a transmit path, then state 205 is entered. Branch 204 is taken if none of the three conditions for branch 202 are met. In state 205, the start of packet pointer is loaded from the read pointer. After state 205, or from state 201 for an upload, the data transfer state 206 is entered. In the data transfer state 206, the packet data is transferred out of the FIFO, and the read pointer is incremented for each segment. From the data transfer state 206, if a collision is indicated before the last byte of the packet, then branch 207 is taken. In this branch, a retransmit state 208 is entered. In a retransmit state 208, the read pointer is recovered from the start of packet pointer, and the process loops back to state 206. This condition occurs only for transmits out on the network. Also from the data transfer state 206, branch 209 is taken if a maximum collision count, an underrun or jabber error condition is detected before the last byte of the packet. In this case, a flush state 210 is entered. In the flush state 210, the read pointer is incremented until it reaches the end of packet pointer to flush the packet. Then the process loops to state 203. If the last byte is successfully reached from the data transfer state 206, then the branch 211 is taken. On this branch, a transfer complete state 212 is entered. In state 212, an end of frame signal is asserted for a transmit process. From the transfer complete state 212, the process loops, unconditionally in the transmit path and upon detection of a receive discard signal in the receive path, to state 203.

Following the process of FIG. 5, or other algorithms, the packet transmit/upload logic is used to transmit downloaded packets through the transmit packet buffer or upload received packets through the receive packet buffer. Upon detecting a packet transfer request from the out of order packet transfer control logic, the frame start header will be read out of the FIFO, the end of packet pointer will be fetched or computed from the read pointer with the packet length to determine the ending location of the packet. The read pointer will be incremented and pointed to the packet data. For transmit, the start of packet pointer will be stored for use in retransmit in the event of a collision. Packet data transmit or upload will be performed until the whole packet is transmitted or uploaded. For the transmit path, a collision will cause the start of packet pointer to be reloaded into the read pointer to cause retransmission. In the case of a maximum collision count or jabber error, the packet is flushed out of the FIFO. After the transmit/upload or flush is completed, the end of packet pointer will be aligned to the next packet boundary and loaded into the read pointer. A packet transfer done signal is asserted to complete the handshake with the out of order packet transfer control logic. The next packet transmit/upload operation will continue from this point. In order to handle priority and IPsec packets in an out of order sequence, the IPsec top flag will be set upon reading the frame start header to indicate that the IPsec packet has become the top packet but has not finished processing. This flag will be used by out of order packet transfer control logic to save the unfinished IPsec packet pointer. The subsequent priority or normal packets can then be transmitted/uploaded without waiting for the top IPsec packet processing to complete. In order to prevent these packets from being transferred again, because of a previous transfer out of order, there are three conditions to skip a packet. The first condition to skip a packet is when both the priority packet and priority done bits are set upon reading the frame start header. Each time a priority packet is transmitted/uploaded, a priority done bit will be set in the frame start header. This bit will be used to insure that after each packet has been transmitted/uploaded, the packet will not be transferred again. The second condition to skip a packet is when the IPsec packet bit is set but the IPsec done bit is not set. This condition is used to ensure that when out of order transfer is invoked, all the unfinished IPsec packets will be skipped when they are not ready to be transmitted/uploaded. The third condition to skip a packet is when both the priority packet and IPsec packet bits are not set, but the normal packet done bit is set. This condition is used to skip normal packets if they have already been transmitted/uploaded because of out of order packet transfer sequences.

Figure 6:
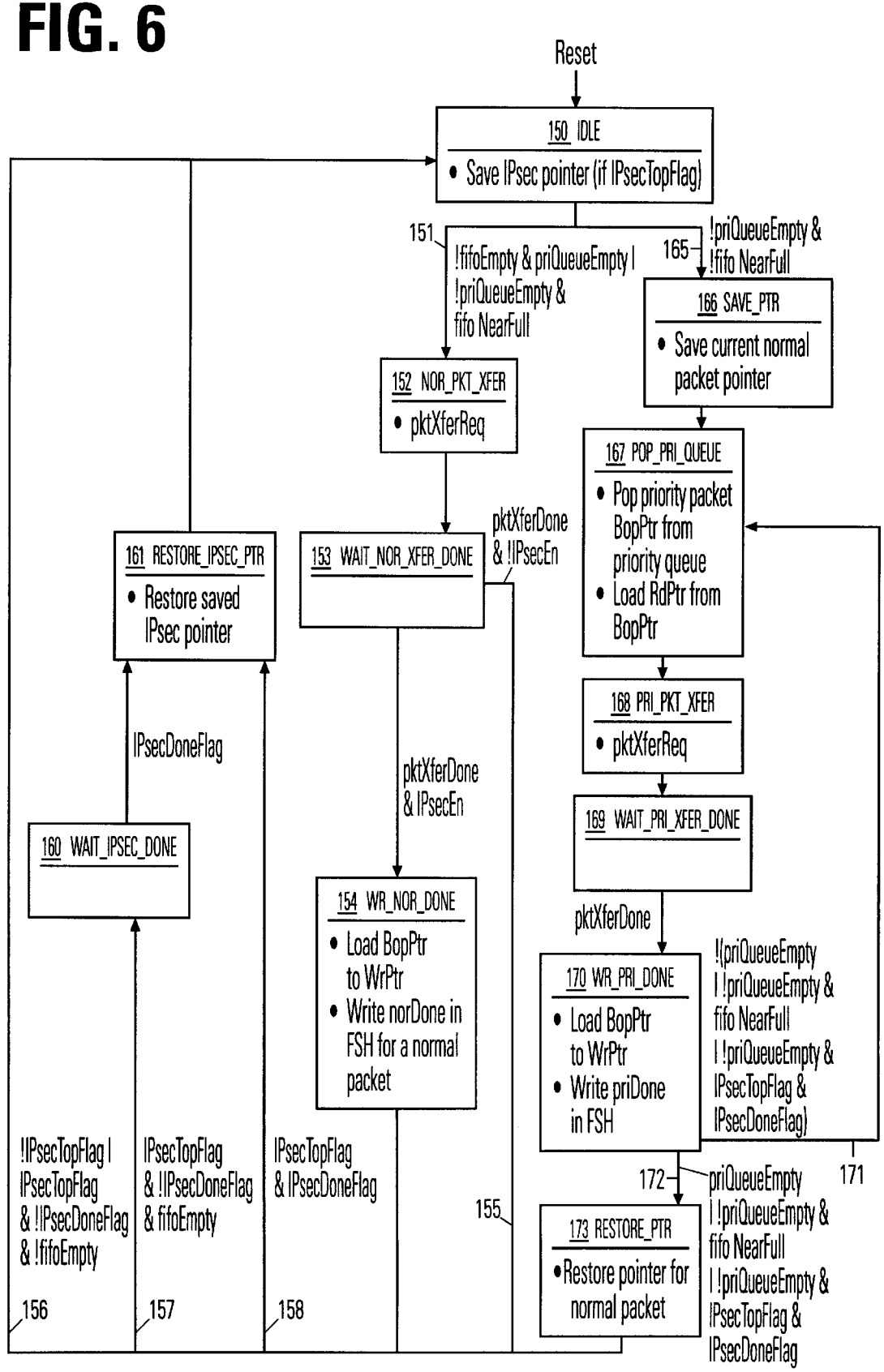
FIG. 6 is a flow diagram illustrating the packet transfer control process for the system of FIG. 1.

FIG. 6 illustrates the out of order packet transfer logic block. This process begins in idle state 150. If an IPsec top flag is set indicating that an IPsec packet is at the top of the FIFO structure, then an IPsec pointer is saved. From state 150, the process takes branch 151 if the FIFO is not empty and the priority queue is empty, or if the priority queue is not empty and the FIFO is near a full condition. On branch 151, a normal packet transfer state 152 is entered. In the normal packet transfer state 152, packet transfer request is issued to the process of FIG. 5, for example. The process then waits for a normal packet transfer done signal in state 153. From state 153, a write normal done state 154 is entered when the packet transfer done signal is asserted and the IPsec enable flag has been set in the logic. If the IPsec enable flag has not been set, and the packet transfer done signal is asserted, the process loops around state 154 on path 155. In the write normal done state 154, the beginning of packet pointer is loaded to the write pointer, and a normal done flag is written in the frame start header for the normal packet. From state 154, or from path 155, three paths 156, 157 and 158 may be taken. Path 156 is taken in the condition that the IPsec top flag is not set, or that the IPsec top flag is set and the IPsec done flag is not set and the FIFO is not empty. Path 156 loops the process back to the idle state 150. The path 157 is taken if the IPsec top flag is set, and the IPsec done flag is not set but the FIFO is empty. Path 157 proceeds to the wait IPsec done state 160. In state 160, the process waits for the IPsec done flag to be asserted and transitions to the restore IPsec pointer state 161. Path 158 is taken if the IPsec top flag is set and the IPsec done flag is set. Path 158 directs the process to the restore IPsec pointer state 161. From state 161, the process proceeds to the idle state 150.

If at state 150, the priority queue is not empty and the FIFO is not near full, then path 165 is taken. Along this path 165, the save pointer state 166 is entered. In state 166, the current normal packet pointer is saved. Next, the pop priority queue entry state 167 is entered. In state 167, the priority packet beginning of packet pointer from the priority queue is popped. The read pointer is loaded using the popped beginning of packet pointer. Next, the priority packet transfer state 168 is entered. In state 168, a packet transfer request is issued. The process then waits for a priority transfer done in state 169. Upon receipt of the priority transfer done signal, a write priority done state 170 is entered. In state 170, the beginning of packet pointer is written to the write pointer, and the priority done bit in the frame start header is written. From state 170, the process may take path 171 back to state 167, or path 172 to the restore pointer path 173.

Path 172 is taken if the priority queue is empty, or if the priority queue is not empty but the FIFO is near full, or if the priority queue is not empty, an IPsec top flag is asserted, and an IPsec done flag is asserted. In this way, if the priority queue is not empty, then normal packets may be processed only if an over flow condition is threatening, or if an IPsec packet is at the top of the FIFO and ready for transfer. In this case, the pointer for the normal packet which was saved in state 166 is restored, and the algorithm loops back to state 150. If the conditions of path 172 are not met, then there are additional packets in the priority queue to be transferred, and no conditions for preempting the priority transfer are detected. In this case, the process loops to state 167 and pops the beginning of packet pointer for the next packet from the priority queue.

Thus, according to this embodiment of the present invention, normal packets, priority packets and IPsec packets can be supported in a single FIFO structure with out of order packet transfer logic. If there are only normal packets in the FIFO, then a packet transfer request is issued for any nonempty FIFO. This request starts the packet transmit/ upload sequence. After the frame start header is read out of the FIFO, and the ending location of the packet is identified, packet data will either be transmitted or uploaded. Upon completing the packet data transfer, the pointer is aligned to the next packet boundary. The packet transfer done signal is generated to complete the handshake with the out of order packet transfer logic.

In the condition that there are both normal packets and priority packets in the FIFO, packets may need to be read out in non-sequential order. Each priority packet being stored into the FIFO will have its priority packet bit set in the final frame start header. The beginning location of each priority packet is pushed into the priority queue. Any nonempty priority queue initiates the priority packet transfer process in the out of order packet transfer logic. After the current normal packet pointer is saved, the beginning of packet pointer is popped out of the priority queue. The packet transfer request is generated. After the priority packet is transferred out of the FIFO, the packet transfer done signal is returned to the out of order packet transfer logic. The logic sets a priority done bit into the packet's frame start header. This bit is used to ensure that the transmitted/uploaded priority packet will not be transferred again after the normal packet transfer path is resumed. After the priority done bit is written, the next priority packet will be serviced if the priority queue is not empty. There are two conditions to exit from the priority packet transfer sequence. The first one is when the priority queue is empty. The second one is when the priority queue is not empty, but the FIFO is reaching a fullness threshold. This second case avoids an undesirable FIFO full condition which could be caused by un-transferred normal packets residing in front of the transferred priority packets. Upon either of the above conditions, the saved normal packet pointer is restored. Packet transfer control is changed back to sequential order processing, and the normal packet pointed to by the restored pointer will be transferred. After transfering the normal packet, any subsequent priority packets with the priority done bit set will be skipped.

In the condition that there are both normal packets and IPsec packets, if an IPsec packet reaches the top of the FIFO before processing of the payload is complete, then the out of order transfer process may be invoked. Thus, upon each IPsec packet being loaded into the FIFO, an IPsec packet bit is written into the final frame start header and the beginning of packet pointer is pushed into the IPsec queue. An encryption/decryption engine can read the entries in the IPsec queue to process each corresponding packet. After the IPsec packet is read out of the FIFO, data encryption/ decryption can be performed. Upon completion of the IPsec packet data processing, the processed packet data is written back into the FIFO, and IPsec done bit is set in the frame start header. Normal packets can be transferred out of the FIFO in parallel with the IPsec packet data processing. All IPsec packets which finish processing prior to becoming the top packet can also be transferred out with the normal packet process sequence. In case the IPsec done bit is not set but the IPsec packet has already become the top packet, out of order packet transfer is invoked. The pointer for the top IPsec packet is saved, and the following normal packets will be transferred out one by one and the normal done bit will be set each time the normal packet is transferred. IPsec packets that are not the top packet will be skipped since their IPsec done bits are not set. Upon completing each normal packet or skipping of the IPsec packet, the IPsec done flag will be checked. Setting this bit will indicate that the top IPsec packet has completed processing and the saved top IPsec packet pointer should be restored. After transferring the top IPsec packet, the above sequences will repeat. Normal packets without the normal done bit set will be transferred. If the normal done bit is set, then the packet will be skipped. For an IPsec packet with the IPsec done bit set, the packet will be transferred. If the IPsec done bit is not set in an IPsec packet, the pointer for this packet will be saved and the out of order transfer sequence will be invoked.

In the case that normal packets, priority packets and IPsec packets coexist in the FIFO, the packet transfer sequence is the same as a FIFO having normal packets with the priority packets as long as processing of IPsec packets is done before they become the top packet. Whenever the priority queue is not empty, the current packet pointer will be saved and priority packets are transferred out of the FIFO. After either the priority queue is empty, or FIFO fullness reaches a fullness threshold, the current packet pointer will be retrieved to resume the normal packet transfer sequence. All the IPsec packets with the IPsec done bit set in the frame start header will be treated as normal packets and transferred to the normal packet transfer sequence.

If an IPsec packet finally becomes the top packet but has not finished processing, the pointer for the unfinished IPsec packet will be saved. Depending on the existence of the priority packet, either one or two levels of out of order transfer will be invoked. One level of out of order transfer will be performed if there is no priority packet currently present. Normal packets will be transferred if the normal done bit is not set; otherwise it will be skipped. An IPsec packet should always be skipped with the assumption that subsequent IPsec packet processing cannot be finished until the top IPsec packet is completed. Upon each packet being transferred or skipped, the IPsec done flag of the top packet will be checked. If the top IPsec packet has finished processing as indicated by the IP second done flag, the saved top IPsec packet pointer will be restored to transfer the top IPsec packet. If priority packets exist while the unfinished IPsec packet becomes top packet, two levels of out of order transfers will be performed. After saving the pointer for the unfinished top IPsec packet, the subsequent normal packets will either be transferred or skipped depending on the state of normal done bit. As soon as the priority queue becomes populated with a new entry, the current normal packet pointer will be saved. The priority packets will be transferred until the priority queue is empty or the FIFO reaches a fullness threshold. Normal packet pointers will be restored and control changed back to one level out of order transfer in this case. The control can switch back and forth between one level and two level out of order transfer sequences depending on the status of the priority queue.

Upon each packet being transferred or skipped, the IPsec done flag will be checked. The completion of the top IPsec packet with the IPsec done flag set will force the saved the IPsec packet pointer to be restored and either one level or two level out of order packet transfer control flow will exit to transfer the finished top IPsec packet.

Figure 7:
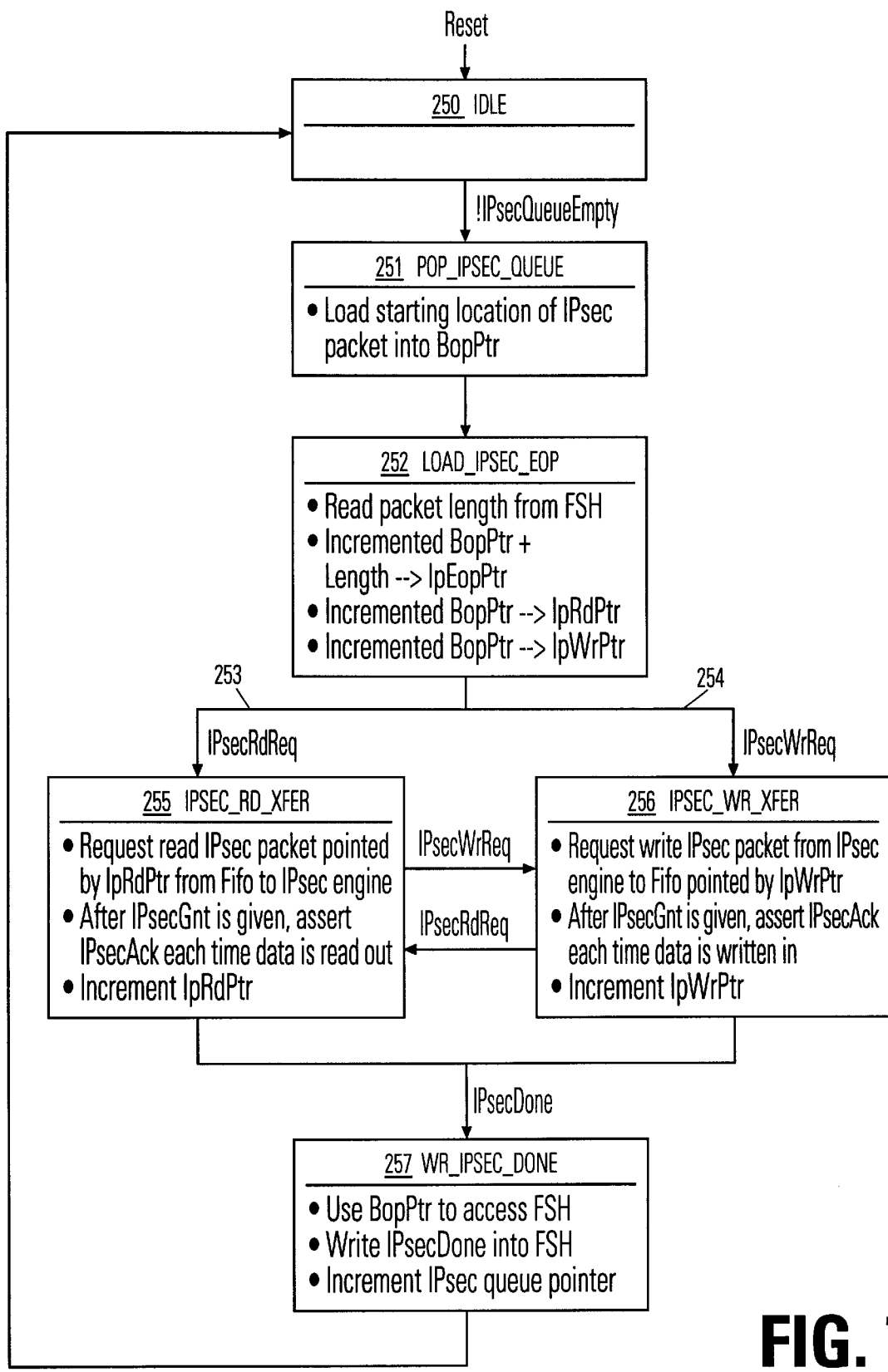
FIG. 7 is a diagram illustrating the processing of IPSec packets for the system of FIG. 1.

FIG. 7 illustrates the IPsec packet processing executed in the block 23 of FIG. 1. This process begins in idle state 250. If the IPsec queue is not empty, then state 251 is entered in which the top value in the IPsec queue is popped. In state 251, the relocation of an IPsec packet is loaded into the beginning of packet pointer. From state 251, state 252 is entered, in which the packet length is read from frame start header. The incremented beginning of packet pointer plus the packet length are used to compute an IP end of packet pointer. The incremented beginning of packet pointer is used as an IP read pointer, and the incremented beginning of packet pointer is used as an IP write pointer. From state 252, path to 253 is taken if the IPsec read request is issued. Path 254 is taken if an IPsec write request is issued. If an IPsec read request is entered, then the read transfer state 255 is entered. In this state, a read to of the IPsec packet pointed to by the IP read pointer is executed from the FIFO into the IPsec engine of block 23. In the IPsec engine 23 asserts that IPsec grant signal, then an IPsec acknowledge signal is issued each time data is read out of the buffer. The IP read pointer is then incremented. From path 254, when an IPsec write request is issued, the IPsec write transfer state 256 is entered. In state 256, a write IPsec packet process moves the processed data from the IPsec engine 23 into the buffer at the location indicated by the IP write pointer. After the IPsec grant is given, an IPsec acknowledge is given each time data is written to the buffer. Next, the IP write pointer is incremented. From states 255 and 256, when an IPsec done signal is asserted, then state 257 is entered. In state 257, the beginning of packet pointer is used to access the frame start header. The IPsec done bit is written into the frame start header, and the IPsec queue pointer is incremented. The process then loops back to state 250.

Thus, processing of packets in a network interface card FIFO can be executed in parallel with the transfer sequence, with out of order transfer according to the present invention. In the embodiment described, IPsec packets are processed using an encryption/decryption engine in the network interface chip. Upon detecting a nonempty IPsec queue, a beginning of packet pointer will be popped out of the IPsec queue. This pointer will be used to access the IPsec packet. The length of the IPsec packet will be fetched from the frame start header. After the beginning of packet pointer is incremented to point to the IPsec packet data, the end of the IPsec packet data will be computed with the packet length and stored as the IP end of packet pointer. The IPsec write pointer and IPsec read pointer are loaded to locate the starting address of the IPsec packet where it is used to read data for processing and write data back after processing is done. Upon completing the processing of the IPsec packet, the beginning of packet pointer will be used to write the IPsec done bit into the frame start header. The IPsec queue pointer will be incremented to the next entry and the next IPsec packet will be handled accordingly.

Sometimes the top IPsec packet may take a long time to process, and the normal packet traffic flow will not be blocked because these packets can be transferred ahead of the unfinished IPsec packet. However, an undesirable FIFO full condition may be detected after subsequent packets are transferred out of the FIFO because the FIFO free space cannot be reclaimed due to the unfinished top IPsec packet. This condition is not a problem for a packet downloaded into the FIFO through the PCI host, because the host will stop downloading if the FIFO is full. Therefore, the host can prevent lost packets. For packets being received from the network, packets could be dropped, and cause a need for re-sending the packet and a resulting performance degradation. A method can be used to mark the top IPsec packet as unprocessed and allow it to be transferred out as soon as possible. After this packet is uploaded through the PCI host, software will identify the packet and process it there. Similar FIFO fullness threshold registers could be used to determine whenever a FIFO is near full. When the near full condition occurs, the top unfinished IPsec packet should be transferred out to free up space.

In the embodiment shown in FIG. 1, a single port memory can be used for the FIFO based packet buffer. Three different access paths are used in parallel. The first path is for the packet download/receive. This path is used to download packets to be transmitted or to receive packets to be uploaded. Only write access to the FIFO exists in this path. The second path is used for packet transmit/upload. This path is used to read out packets to be transmitted from the FIFO, or to be uploaded to the PCI host. Only read access to the FIFO can occur in this path. The third path is used to service IPsec packet processing and write priority done, normal done and IPsec done bits back to the frame start headers.

In one example implementation, in order to support a 133 MHz PCI-X bus (1066 Megabits/second) and Gigabit wire speeds (125 Megabytes/second rounded up to 133 Megabytes/second), a 128 bit memory data width is used. In order to achieve the desired performance, a minimum 83 MHz memory clock rate is required to obtain the 1332

Megabits/second bandwidth. Memory bandwidth of 133 Megabyte/second can be allocated to the IPsec packet processing and packet complete status updating. In order to prevent IPsec packet processing from using more than the allocated bandwidth, the sustained access bandwidth cannot exceed 133 Megabytes/second. If higher performance for IPsec processing is desired, then the memory clock rate or data width can be increased.

The chip also performs a FIFO space calculation. A FIFO empty indication is used to determine whether all packets in the FIFO have been transferred out. Since a packet can be transferred out of sequential order, while transferring a priority packet, the saved packet read pointer should be used for comparison with the write pointer to determine the amount of free space in the FIFO, and to determine the FIFO full and FIFO empty states. When an IPsec packet becomes the top packet but has not finished processing, the saved read pointer from the top IPsec packet should be used for the FIFO free space, and FIFO full calculation. The read pointer which is used for reading out nonsequential normal packets or priority packets should be compared with the write pointer for the FIFO empty calculation.

Figure 8:
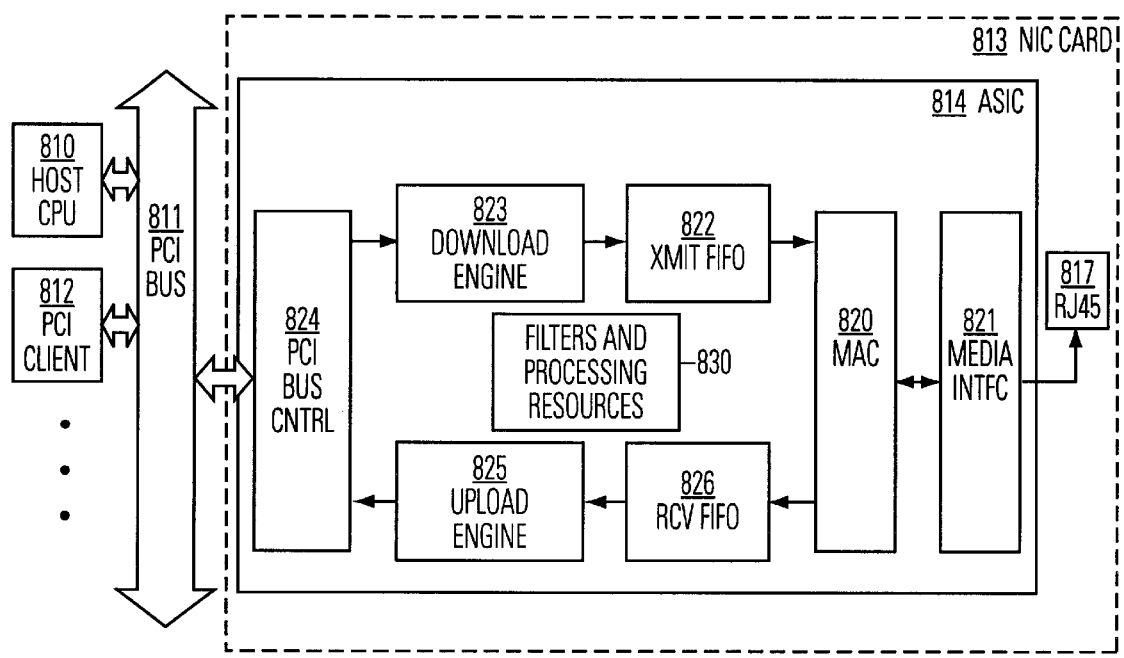
FIG. 8 is a simplified diagram of a computer system including the network interface of the present invention.

FIG. 8 provides a basic diagram of a computer system having a host CPU 810 coupled to a bus system 811, such as a PCI bus. The bus 811 interconnects a plurality of PCI clients, including client 812 and the network interface card 813 shown with expanded functional blocks. The network interface card 813 includes an application specific integrated circuit ASIC 814. The ASIC 814 includes network interface functions for an Ethernet interface in this embodiment. Other embodiments provide interfaces to other types of the network media. In addition to the ASIC 814, other components are interconnected by and supported by the circuit board of the network interface card 813. For example, a BIOS ROM (not shown), an EEPROM (not shown) and an RJ45 connector 817 are on the circuit board.

The ASIC 814 includes a medium access controller 820 coupled to media interface circuitry 821 to the connector 817. The medium access controller 820 is also coupled to a transmit FIFO buffer 822 which is driven by a download engine 823 on the ASIC 814. The download engine 823 is coupled to a PCI bus controller 824. The PCI bus controller 824 is also coupled to an upload engine 825. The upload engine 825 is coupled to a receive FIFO 826 which is connected to the medium access controller 820. Thus, the illustration of the ASIC 814 includes basic elements of a network interface controller chip.

In addition, the ASIC 814 includes resources 830 coupled to FIFO structures 822 and 826, and to the upload and download engines, for managing the out of order transferring of packets into and out of the buffer as described in detail above.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computer system, comprising:

a host processor;

a network interface having a first port coupled to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types; and logic to transfer packets out of the buffer to the other of the first and second ports according to the order of receipt, and according to the respective packet types so that packets having a particular packet type are transferred out of the order of receipt, relative to packets having another packet type.

2. The computer system of claim 1, comprising logic to maintain a list of packets stored in the buffer having the particular packet type, and wherein the logic to transfer packets is responsive to the list.

3. The computer system of claim 1, comprising logic to set parameters associated with the packets in the buffer having the particular packet type, and the logic to transfer packets is responsive to the parameters.

4. The computer system of claim 1, wherein the particular type of packet comprises a priority packet.

5. The computer system of claim 1, wherein the particular type of packet comprises a packet suitable for processing with a security protocol.

6. The computer system of claim 1, wherein the logic to transfer the packets includes processing resources which write a control field in the buffer in association with each packet, indicating the type of packet, whether the packet is ready for transfer, and whether the packet has already been transferred.

7. A computer system, comprising:

a host processor;

a network interface having a first port coupled to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types;

logic to transfer packets out of the buffer to the other of the first and second ports according to the order of receipt, and according to the respective packet types so that packets having a particular packet type are transferred out of the order of receipt, relative to packets having another packet type; and a data filter coupled with the buffer to generate identifiers which identify packets of data stored in the buffer as members of one of a plurality of packet types.

8. A computer system, comprising:

a host processor;

a network interface having a first port coupled to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types;

logic to transfer packets out of the buffer to the other of the first and second ports according to the order of receipt, and according to the respective packet types so that packets having a particular packet type are transferred out of the order of receipt, relative to packets having another packet type;

a data filter coupled with the buffer to generate identifiers which identify packets of data as members of one of a plurality of packet types when the packets are stored in the buffer; and logic to write the identifiers in the buffer.

9. A computer system, comprising:

a host processor;

a network interface having a first port coupled to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types; and logic to transfer packets out of the buffer to the other of the first and second ports according to the order of receipt, and according to the respective packet types so that packets having a particular packet type are transferred out of the order of receipt, relative to packets having another packet type;

wherein the particular type of packet comprises a payload suitable for processing according to a particular process prior to transfer, and the network interface includes logic, responsive to the particular packet type, to process the payload according to the particular process and generate control data associated with the particular packet indicating a state of the processing, and the logic to transfer the packet is responsive to the control data so that the particular packet may be transferred out of the order of receipt relative to other packets having other packet types and other packets having the particular packet type based on the control data.

10. A computer system, comprising:

a host processor;

a network interface having a first port coupled to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types; and logic to transfer packets out of the buffer to the other of the first and second ports according to the order of receipt, and according to the respective packet types so that packets having a particular packet type are transferred out of the order of receipt, relative to packets having another packet type;

wherein the particular process comprises a security protocol compliant with IPsec.

11. A computer system, comprising:

a host processor;

a network interface having a first port coupled to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types; and logic to transfer packets out of the buffer to the other of the first and second ports according to the order of receipt, and according to the respective packet types so that packets having a particular packet type are transferred out of the order of receipt, relative to packets having another packet type;

wherein the logic to transfer the packets includes processing resources which set up a control field for each packet stored in the buffer;

write parameters in the control field indicating the packet type, and whether the packet has already been transferred;

maintain a queue of entries identifying packets having the particular packet type;

maintain an indicator of fullness of the buffer; and transfer a packet from the buffer according to a priority rule which causes transfer of a packet identified by an entry in the queue out of the order of receipt, and causes transfer of a packet not identified by an entry in the queue in the order of receipt of the packet, if the parameters in the control field indicate the packet has not already been transferred, and the queue of entries is empty or the indicator of fullness exceeds a threshold.

12. A computer system, comprising:

a host processor;

a network interface having a first port coupled to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types; and logic to transfer packets out of the buffer to the other of the first and second ports according to the order of receipt, and according to the respective packet types so that packets having a particular packet type are transferred out of the order of receipt, relative to packets having another packet type;

wherein the logic to transfer the packets includes processing resources which set up a control field for each packet stored in the buffer;

write a parameter in the control field indicating the packet type;

process packets having the particular packet type according to a particular process;

write a parameter in the control field indicating whether the processing according to the particular process is complete; and transfer a packet from the buffer according to a priority rule which skips transfer of a packet having the particular packet type if the parameter in the control field indicates the processing is not complete, and causes transfer of a packet in the order of receipt, if parameters in the control field indicates the packet is ready for transfer.

13. A computer system, comprising:

a host processor;

a network interface having a first port coupled to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types; and logic to transfer packets out of the buffer to the other of the first and second ports according to the order of receipt, and according to the respective packet types so that packets having a particular packet type are transferred out of the order of receipt, relative to packets having another packet type;

wherein the plurality of packet types includes first and second packet types in addition to the particular packet type, and the logic to transfer the packets includes processing resources which set up a control field for each packet stored in the buffer;

write parameters in the control field indicating the packet type, and whether the packet has already been transferred;

maintain a queue of entries identifying packets having the particular packet type;

process packets having the second packet type according to a particular process;

write a parameter in the control field for packets having the second packet type indicating whether the processing according to the particular process is complete;

maintain an indicator of fullness of the buffer; and transfer a packet from the buffer according to a priority rule which causes transfer of a packet identified by an entry in the queue ahead of packets in the buffer having the first and second packet types relative to the order of receipt, causes transfer of a packet having the first packet type in the order of receipt, if the parameters in the control field indicate the packet is ready for transfer, and the queue of entries is empty or the indicator of fullness exceeds a threshold, and causes transfer of a packet having the second packet type after packets having the first packet type relative to the order of receipt if the parameter in the control field indicates the processing is not complete.

14. The computer system of claim 13, wherein the particular type of packet comprises a priority packet, and the second type of packet comprises a packet suitable for processing with a security protocol.

15. A method for managing transfer of data packets between a host processor and a network, comprising:

storing packets in a first-in-first-out buffer in an order of receipt;

identifying packets as having respective packet types from a plurality of packet types; and transferring packets out of the first-in-a first-out buffer according to the order of receipt, and according to the packet type so that packets having a particular packet type are transferred out of the order of receipt relative to packets having another packet type.

16. The method of claim 15, wherein the particular type of packet comprises a priority packet.

17. The method of claim 15, wherein the particular type of packet comprises a packet suitable for processing with a security protocol.

18. A method for managing transfer of data packets between a host processor and a network, comprising:

storing packets in a first-in-first-out buffer in an order of receipt;

identifying packets as having respective packet types from a plurality of packet types;

transferring packets out of the first-in-a first-out buffer according to the order of receipt, and according to the packet type so that packets having a particular packet type are transferred out of the order of receipt relative to packets having another packet type;

setting up a control field for each packet stored in the buffer;

writing a parameter in the control field indicating the packet type;

processing packets having the particular packet type according to a particular process;

writing a parameter in the control field indicating whether the processing according to the particular process is complete; and transferring a packet from the buffer according to a priority rule which skips transferring of a packet having the particular type if the parameter in the control field indicates the process is not complete.

19. A method for managing transfer of data packets between a host processor and a network, comprising:

storing packets in a first-in-first-out buffer in an order of receipt;

identifying packets as having respective packet types from a plurality of packet types; and transferring packets out of the first-in-a first-out buffer according to the order of receipt, and according to the packet type so that packets having a particular packet type are transferred out of the order of receipt relative to packets having another packet type;

wherein the plurality of packet types includes first and second packet types in addition to the particular packet type, and including:

setting up a control field for each packet stored in the buffer indicating an order of receipt;

writing parameters in the control field indicating the packet type, and whether the packet has already been transferred;

maintaining a queue of entries identifying packets having the particular packet type;

processing packets having the second packet type according to a particular process;

writing a parameter in the control field for packets having the second packet type indicating whether the processing according to the particular process is complete;

maintaining an indicator of fullness of the buffer; and transferring a packet from the buffer according to a priority rule which causes transferring of a packet identified by an entry in the queue ahead of packets in the buffer having the first and second packet types relative to the order of receipt, causes transferring of a packet having the first packet type in the order of receipt the packet, if the parameters in the control field indicate the packet has not already been transferred, and the queue of entries is empty or the indicator of fullness exceeds a threshold, and skips transferring of a packet having the second packet type if the parameter in the control field indicates the processing is not complete.

20. The method of claim 19, wherein the particular type of packet comprises a priority packet, and the second type of packet comprises a packet suitable for processing with a security protocol.

21. A method for managing transfer of data packets between a host processor and a network, comprising:

storing packets in a first-in-first-out buffer in an order of receipt;

identifying packets as having respective packets types from a plurality of packets types;

transferring packets out of the first-in-first-out buffer according to the order of receipt, and according to the packet type so that packets having a particular packet type are transferred out of the order of receipt relative to packets having another packet type; and storing control parameters associated with packets in the first-in-first-out buffer, the control parameters indicating the packet type, whether the packet is ready for transfer, and whether the packet has already been transferred.

22. A method for managing transfer of data packets between a host processor and a network, comprising:

storing packets in a first-in-first-out buffer in an order of receipt;

identifying packets as having respective packet types from a plurality of packet types;

transferring packets out of the first-in-a first-out buffer according to the order of receipt, and according to the packet type so that packets having a particular packet type are transferred out of the order of receipt relative to packets having another packet type;

setting up a control field for each packet stored in the buffer;

writing parameters in the control field indicating the packet type, and whether the packet has already been transferred;

maintaining a queue of entries identifying packets having the particular packet type;

maintaining an indicator of fullness of the buffer; and transferring a packet from the buffer according to a priority rule which causes transferring of a packet identified by an entry in the queue out of the order of receipt, and causes transferring of a packet not identified by an entry in the queue in the order of receipt the packet, if the parameters in the control field indicate the packet is ready for transfer and has not already been transferred, and the queue of entries is empty or the indicator of fullness exceeds a threshold.

23. An integrated circuit for use in a network interface for a host computer, comprising:

a first port adapted for at least one of receiving data from and transmitting data to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types; and logic to transfer packets out of the buffer to the other of the first and second ports according to the order of receipt, and according to the respective packet types so that packets having a particular packet type are transferred out of the order of receipt, relative to packets having another packet type.

24. The integrated circuit of claim 23, comprising logic to maintain a list of packets stored in the buffer having the particular packet type, and wherein the logic to transfer packets is responsive to the list.

25. The integrated circuit of claim 23, comprising logic to set parameters associated with the packets in the buffer having the particular packet type, and the logic to transfer packets is responsive to the parameters.

26. The integrated circuit of claim 23, wherein the particular type of packet comprises a priority packet.

27. The integrated circuit of claim 23, wherein the particular type of packet comprises a packet suitable for processing with a security protocol.

28. The integrated circuit of claim 23, wherein the logic to transfer the packets includes processing resources which write a control field in the buffer in association with each packet, indicating the type of packet, whether the packet is ready for transfer, and whether the packet has already been transferred.

29. An integrated circuit for use in a network interface for a host computer, comprising:

a first port adapted for at least one of receiving data from and transmitting data to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types;

logic to transfer packets out of the buffer to the other of the first and second ports according to the order of receipt, and according to the respective packet types so that packets having a particular packet type are transferred out of the order of receipt, relative to packets having another packet type;

a data filter coupled with the buffer to generate identifiers which identify packets of data as members of one of a plurality of packet types when the packets are stored in the buffer; and logic to write the identifiers in the buffer.

30. An integrated circuit for use in a network interface for a host computer, comprising:

a first port adapted for at least one of receiving data from and transmitting data to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types;

logic to transfer packets out of the buffer to the other of the first and second ports according to the order of receipt, and according to the respective packet types so that packets having a particular packet type are transferred out of the order of receipt, relative to packets having another packet type; and a data filter coupled with the buffer to generate identifiers which identify packets of data stored in the buffer as members of one of a plurality of packet types.

31. An integrated circuit for use in a network interface for a host computer, comprising:

a first port adapted for at least one of receiving data from and transmitting data to the host processor, and second port adapted for at least one of receiving data from and transmitting data to a network;

a buffer coupled to the first and second ports which stores data packets from one of the first and second ports in an order of receipt, said packets identifiable as having respective packet types from a plurality of packet types; and logic to transfer packets out of the buffer to the other of the first and second ports according to the order of receipt, and according to the respective packet types so that packets having a particular packet type are transferred out of the order of receipt, relative to packets having another packet type;

wherein the particular type of packet comprises a payload suitable for processing according to a particular process prior to transfer, and the integrated circuit includes logic, responsive to the particular packet type, to process the payload according to the particular process and generate control data associated with the particular packet indicating a state of the processing, and the logic to transfer the packet is responsive to the control data so that the particular packet may be transferred out of the order of receipt relative to other packets having other packet types and other packets having the particular packet type based on the control data.

32. The integrated circuit of claim 31, wherein the particular process comprises a security protocol compliant with IPsec.

33. An integrated circuit for use in a network interface for a host computer, comprising:
- a first port adapted for at least one of receiving data from and transmitting data to the host processor, and second port adapted for at least one of receiving data from and transmitting data to a network;
- a buffer coupled to the first and second ports which stores data packets from one of the first and second ports in an order of receipt, said packets identifiable as having respective packet types from a plurality of packet types; and
- logic to transfer packets out of the buffer to the other of the first and second ports according to the order of receipt, and according to the respective packet types so that packets having a particular packet type are transferred out of the order of receipt, relative to packets having another packet type;
- wherein the logic to transfer the packets includes processing resources which
- set up a control field for each packet stored in the buffer;
- write parameters in the control field indicating the packet type, and whether the packet has already been transferred;
- maintain a queue of entries identifying packets having the particular packet type;
- maintain an indicator of fullness of the buffer; and
- transfer a packet from the buffer according to a priority rule which
  - causes transfer of a packet identified by an entry in the queue out of the order of receipt, and
  - causes transfer of a packet not identified by an entry in the queue in the order of receipt the packet, if the parameters in the control field indicate the packet has not already been transferred, and the queue of entries is empty or the indicator of fullness exceeds a threshold.

34. An integrated circuit for use in a network interface for a host computer, comprising:
- a first port adapted for at least one of receiving data from and transmitting data to the host processor, and second port adapted for at least one of receiving data from and transmitting data to a network;
- a buffer coupled to the first and second ports which stores data packets from one of the first and second ports in an order of receipt, said packets identifiable as having respective packet types from a plurality of packet types; and
- logic to transfer packets out of the buffer to the other of the first and second ports according to the order of receipt, and according to the respective packet types so that packets having a particular packet type are transferred out of the order of receipt, relative to packets having another packet type;
- wherein the logic to transfer the packets includes processing resources which
- set up a control field for each packet stored in the buffer;
- write a parameter in the control field indicating the packet type;
- process packets having the particular packet type according to a particular process;
- write a parameter in the control field indicating whether the processing according to the particular process is complete; and
- transfer a packet from the buffer according to a priority rule which
  - skips transfer of a packet having the particular packet type if the parameter in the control field indicates the processing is not complete, and
  - causes transfer of a packet in the order of receipt, if parameters in the control field indicates the packet is ready for transfer.

35. An integrated circuit for use in a network interface for a host computer, comprising:
- a first port adapted for at least one of receiving data from and transmitting data to the host processor, and second port adapted for at least one of receiving data from and transmitting data to a network;
- a buffer coupled to the first and second ports which stores data packets from one of the first and second ports in an order of receipt, said packets identifiable as having respective packet types from a plurality of packet types; and
- logic to transfer packets out of the buffer to the other of the first and second ports according to the order of receipt, and according to the respective packet types so that packets having a particular packet type are transferred out of the order of receipt, relative to packets having another packet type;
- wherein the plurality of packet types includes first and second packet types in addition to the particular packet type, and the logic to transfer the packets includes processing resources which
- set up a control field for each packet stored in the buffer;
- write parameters in the control field indicating the packet type, and whether the packet has already been transferred;
- maintain a queue of entries identifying packets having the particular packet type;
- process packets having the second packet type according to a particular process;
- write a parameter in the control field for packets having the second packet type indicating whether the processing according to the particular process is complete;
- maintain an indicator of fullness of the buffer; and
- transfer a packet from the buffer according to a priority rule which
  - causes transfer of a packet identified by an entry in the queue ahead of packets in the buffer having the first and second packet types relative to the order of receipt,
  - causes transfer of a packet having the first packet type in the order of receipt, if the parameters in the control field indicate the packet is ready for transfer, and the queue of entries is empty or the indicator of fullness exceeds a threshold, and
  - causes transfer of a packet having the second packet type after packets having the first packet type relative to the order of receipt if the parameter in the control field indicate the processing is complete.

36. The integrated circuit of claim 35, wherein the particular type of packet comprises a priority packet, and the second type of packet comprises a packet suitable for processing with a security protocol.

* * * * *